United States Patent Office 2,694,011
Patented Nov. 9, 1954

2,694,011

POULTRY AND SWINE FEEDS CONTAINING ROOTLETS OF GERMINATED BARLEY

Alexander Frieden and Johannes C. Hoogerheide, Whitefish Bay, and Robert M. Stern, Milwaukee, Wis., assignors to Pabst Brewing Company, Milwaukee, Wis., a corporation of Delaware No Drawing. Application November 5, 1949,
Serial No. 125,843

3 Claims. (Cl. 99—2)

This invention relates to growth factor compositions. More particularly it relates to growth factor compositions derived from the rootlets of germinated barley, especially poultry and swine feeds containing the rootlets.

It has been known for a number of years that animals, and particularly poultry and non-ruminants, such as swine, cannot maintain proper growth on feed composed of vegetable protein as the sole protein source. Such feeds must contain animal protein in goodly amounts. Recently it has been found that vegetable protein can be used as the sole protein source provided a nutritional factor is incorporated with the feed. This factor is known as the "animal protein factor." It is present in substantial amounts in liver and other animal organs, in concentrated fish solubles, in milk, in meat scraps and other such products. Considerable evidence has been accumulated which indicates that the "animal protein factor" and vitamin B12 are one and the same thing. Vitamin B12 has recently been isolated from liver and used pharmaceutically for treating pernicious anemia. It has been used nutritionally in feed where it acts similarly to the "animal protein factor."

One of the objects of the present invention is to provide a vegetable source of a growth factor which acts nutritionally similar to the "animal protein factor."

Another object of the invention is to provide new and improved growth factor compositions derived from vegetable sources.

Still a further object of the invention is to provide a new and improved method for preparing growth factor compositions from vegetable sources. Other objects will appear hereinafter.

In accordance with the invention it has been found that the rootlets of germinated barley contain substantial amounts of a growth factor which acts nutritionally in a manner similar to the "animal protein factor." The presence of this growth factor in the rootlets has been determined by subjecting such rootlets to microbiological assays with *L. leichmannii* as employed in the determination of vitamin B12. These observations have also been confirmed by feeding tests. The growth factor is developed from a vegetable source by germinating barley. The growth factor is concentrated in the rootlets formed by the germination. The rootlets thus formed may be used as such as a component of a food, as, for example, an animal food, or the rootlets may be extracted to form a concentrate containing the growth factor.

In the practice of the invention it has been found that the growth factor as evaluated by tests for vitamin B12 increases with the germinating time until an optimum is reached. Further germination thereafter causes a decrease in the growth factor formation.

The temperature of germination of the rootlets containing the growth factor is subject to variation but is preferably within the range of 50 degrees F. to 80 degrees F. Good results have been obtained at temperatures around 60 degrees F. Germination is usually considered to be complete when the acrospire grows to two-thirds or three-fourths the length of the kernel. The optimum concentration of the growth factor appears to occur when the acrospire is about three-fourths of the length of the kernel.

Poultry and swine feed compositions prepared in accordance with this invention contain up to 10% by weight of the rootlets of germinated barley, the preferred range being 1% to 10% by weight and the preferred optimum being around 4% by weight of the total animal feed. The germinated rootlets also provide protein and other food values. The employment of a quantity of the germinated rootlets larger than 10% by weight of the total feed composition is not necessary and is undesirable in feeds for animals having short alimentary canals, such as chickens and hogs, due to the high fiber content of the germinated rootlets. Heretofore, germinated cereal grains, such as malt sprouts which usually contain a minimum of 24% protein, have been considered unfit for poultry feeding because their high fiber content which may be as much as 16% by weight causes swelling in the crop of the chick thereby producing discomfort and preventing the natural grinding action. It has been found in the practice of the present invention, however, that the inclusion of a small amount of germinated barley rootlets (preferably not more than 10% by weight) in a poultry feed does not cause discomfort or affect food intake by the chick and at the same time supplies a growth factor equivalent to the animal protein growth factor which makes it possible to reduce and even to eliminate entirely the need for animal protein in the feed.

In carrying out the invention rootlets have been produced from barley and the growth promoting activity of the resultant rootlets has been evaluated by testing the products with the *L. leichmannii*, a test organism generally employed for the evaluation of vitamin B12, and also by feeding tests with chickens and rats. Comparable tests were made with numerous dicotyledons and with the other monocotyledons. Germinated barley rootlets produced the best results and showed potencies within the range of 200 to 1000 milligammas per gram, as measured by *L. leichmannii*.

The following examples illustrate the practice of the invention and the evaluation of the products produced in accordance with the invention. It will be understood that these examples are illustrative and not limitative.

*Example I*

Barley was steeped in water at 60 degrees F. for 40 hours. During this stage the barley absorbed about 45% moisture. The process was carried on with running water and with aeration. The running water cleans and cools the barley while the aeration helps to stimulate the germ. At the end of the steeping the water was run off and the wet grain transferred to compartments or rotating drums for germination. During germination the moisture was generally maintained at between 44 to 48% and humidified air was passed through the moist grain. The temperature of the germinated grain was maintained at about 60 degrees F. The growth factor was evaluated by testing samples of the cereal rootlets at intervals according to the testing procedure employed for the evaluation of vitamin B12 with *L. leichmannii*. In one run after 55 hours of germination the evaluation test showed the presence of growth factor in an amount equivalent to 490 milligammas of vitamin B12 as measured with the above organism. After 79 hours the equivalent was 662 milligammas, after 127 hours 800 milligammas and after 156 hours 660 milligammas. Further sprouting or germination of the barley decreased the growth factor to below 500 milligamma equivalents of vitamin B12. Thus it appears that there was an optimum development of the growth factor around the fifth day and a decrease thereafter. The germinated grain was dried gradually at low temperatures from 65 degrees F. to about 100 degrees F. and then as the moisture decreased at higher temperatures, gradually increasing to between 160 degrees F. and 170 degrees F.

The rootlets were removed from the germinated barley by shaking. When dry they come off very readily.

*Example II*

Rootlets were obtained from the germination of the following seeds in the manner described for barley in Example I, the germinating temperature being about 60 degrees F. and the time about six days with the results shown in the table.

The growth factor is expressed as equivalents to vitamin $B_{12}$ using *L. leichmannii* as the testing organism.

| Rootlets Obtained from the Germination of the following Plant Seeds | Milligammas per Gram |
|---|---|
| Artichoke | less than 3. |
| Buckwheat | less than 3. |
| Radish | less than 3. |
| Watermelon | less than 4. |
| Rhubarb | less than 4. |
| Cucumber | 15. |
| Tomato | 18. |
| Brussel Sprouts | 20. |
| Castor Bean | 23. |
| Soybean | 27. |
| Potato | 33. |
| Canadian Pea | 34. |
| Mung Bean | 35. |
| Tobacco | 36. |
| Mustard | 37. |
| Leaf Lettuce | 38. |
| Sweet Clover | 39. |
| Sugar Beet | 47. |
| Onion | 88. |
| Rye | 125. |
| Oat | 151. |
| Wheat | 238. |
| Corn | 239. |
| Barley | 500. |

The results demonstrate that barley produces rootlets containing much larger amounts of the growth factor than other monocotyledons and that the dicotyledons do not produce sufficient amounts of the growth factor to make them comparable.

*Example III*

Rootlets of barley prepared as described in Example I were employed in chick feeding tests in comparison with poultry feeds containing no added animal protein factor, with poultry feeds containing 3% fish solubles, and with poultry feeds containing 0.4% 1-20 liver powder, with the results shown in the following table.

| Group [1] | Supplement | Weight at 4 weeks | Response in Grams | Percent Response |
|---|---|---|---|---|
| 1 | Negative control | 246 | | |
| 2 | 3% fish solubles | 299 | 53 | 100 |
| 3 | 0.4% 1-20 liver powder | 296 | 50 | 94.5 |
| 4 | 3% malt rootlets | 284 | 38 | 71.8 |

[1] Twenty chicks per group.

The method used for feeding was that described by Robblee, Nichol, Cravens, Elvehjem and Halpin, from the Proceedings of the Society for Experimental Biology and Medicine, 67, 400–404 (1948) (0.05% Protamone).

The response of 71.8% with 3% malt rootlets added to the poultry feed is unusually good.

*Example IV*

A rat feeding test was made by adding 10% by weight of the malt rootlets of Example I to the feed and gave as high a response as an injection of 0.1 of a gamma of pure vitamin $B_{12}$ which is considered a maximum response in the case of rats.

The invention provides a new source of growth factors from a vegetable source which can be employed to replace the growth factors heretofore derived only from animal sources. The invention also provides new and improved poultry feeds and swine feeds. The compositions of the invention are readily obtainable and may be derived as by-products from germinated barley where the sprouted grain after removal of the rootlets in accordance with the present invention is employed for another purpose. The rootlets may be ground or used as such in the practice of the invention.

It will be understood that although the growth factor has been evaluated in terms of a test for vitamin $B_{12}$, it does not follow that the growth factor present in the rootlets of germinated barley is vitamin $B_{12}$. It may possibly be a closely related or similar substance.

The invention is hereby claimed as follows:

1. Poultry and swine feeds containing as a source of a growth factor providing the response of the animal protein factor a growth-promoting quantity not exceeding 10% by weight of the feed of rootlets of germinated barley.

2. A poultry feed containing as a source of a growth factor providing the response of the animal protein factor a growth-promoting quantity not exceeding 10% by weight of the feed of rootlets of germinated barley having a content of said growth factor of 200 to 1000 milligammas per gram as assayed microbiologically by *L. leichmannii*.

3. A swine feed containing as a source of a growth factor providing the response of the animal protein factor a growth-promoting quantity not exceeding 10% by weight of the feed of rootlets of germinated barley having a content of said growth factor of 200 to 1000 milligammas per gram as assayed microbiologically by *L. leichmannii*.

References Cited in the file of this patent

UNITED STATES PATENTS

| Number | Name | Date |
|---|---|---|
| 1,396,235 | Reustrom | Nov. 8, 1921 |
| 1,950,418 | Schrier | Mar. 13, 1934 |
| 2,168,532 | McMath | Aug. 8, 1939 |
| 2,168,724 | Watson | Aug. 8, 1939 |

FOREIGN PATENTS

| Number | Country | Date |
|---|---|---|
| 328,942 | Great Britain | 1930 |

OTHER REFERENCES

"Malting and Brewing," by Hopkins and Krause, 1937. Published by Unwin Brothers Ltd. (page 142).